Figure 1:
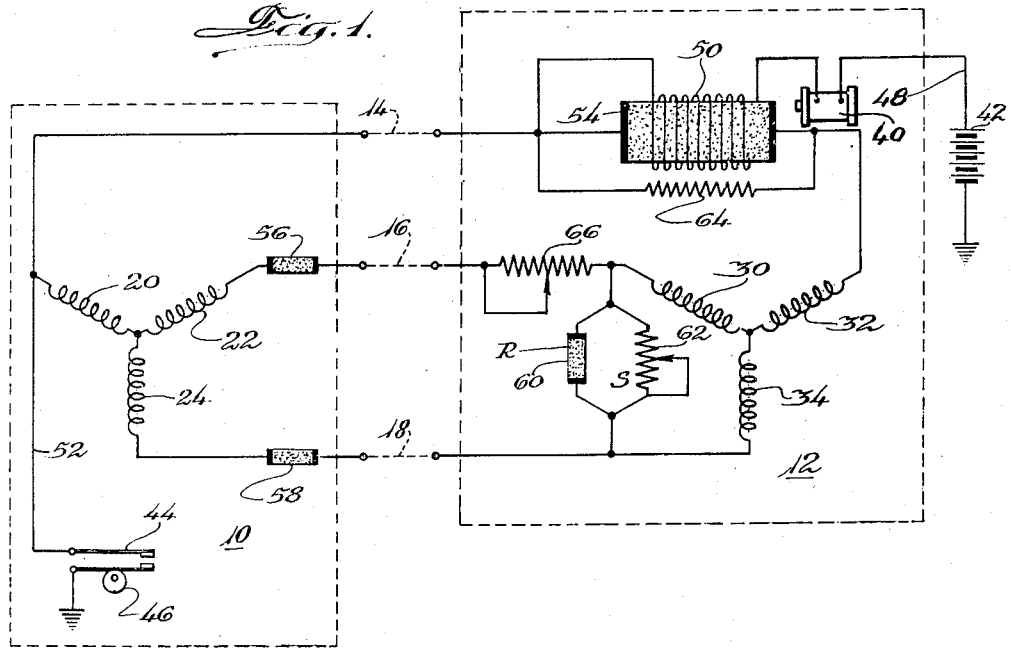

July 12, 1949.

H. M. NORMAN 2,475,912

AMBIENT TEMPERATURE AND ELECTRICAL
CURRENT COMPENSATED INDICATOR
Filed March 4, 1944

Inventor:
Horace M. Norman
By Williams, Bradbury & Hull
Attorneys.

Patented July 12, 1949

2,475,912

UNITED STATES PATENT OFFICE 2,475,912

AMBIENT TEMPERATURE AND ELECTRICAL CURRENT COMPENSATED INDICATOR

Horace M. Norman, Skokie, Ill., assignor to Stewart-Warner Corporation, Chicago, Ill., a corporation of Virginia Application March 4, 1944, Serial No. 525,125

7 Claims. (Cl. 171—95)

The present invention pertains to electric speed indicators and has for its primary object the provision of a new and improved receiving unit for an indicator of this type.

Efforts have heretofore been made to minimize variations in the readings of electric speedometers arising from changes in ambient temperatures, and from variations in current flow through conductive parts of the systems, which ordinarily include sending and receiving units. The sending unit customarily is a generator driven at a speed proportional to the speed of the device whose speed is to be indicated, and the receiving unit comprises an indicator moved to different positions responsive to the speed of the device by means such as a motor device of the induction type adapted to develop a torque and move a speed cup operatively connected to the indicator against the resistance of a spring. A system of this character is disclosed and claimed in my Patent No. 2,339,743, granted January 18, 1944.

Electric speed indicators are used for various purposes and in surroundings where considerable temperature changes occur. For instance, they may be used for indicating the translatory speed of a vehicle such as an automobile or a tank, and for indicating the rotary speeds of engines such, for instance, as an airplane engine. The range of temperature variation in proximity to the receiving unit may be from about 20° F. or more, below zero to 120° F.

One of the primary objects of the present invention is the provision of a new and improved electric speed indicator receiving unit wherein variations in readings resulting from changes in ambient temperature are minimized to provide more accurate readings.

Another object of the present invention is the provision of a new and improved electric speedometer wherein variations in readings of the receiving unit resulting from temperature changes due to heating by current flow are minimized.

Another and more specific object is the provision of a new and improved electric speed indicator receiving unit wherein more effective temperature compensation is provided by a pair of resistors having negative temperature coefficients of resistance, one of which is located in series with one phase and the other in shunt across two phases of a three-phase receiving unit and in proximity to the unit.

Another object of the present invention is the provision of a new and improved electric speed indicator, and especially a receiving unit, wherein good temperature compensation is provided by negative coefficient resistors available on the market and which may not have the desired characteristics, and wherein the compensation is provided with resistors of smaller size.

Another object of the invention is to provide a new and improved electric speed indicator receiving unit wherein change in readings with time, which may be called "creeping," is minimized.

Another more specific object of the present invention is the provision of a new and improved electric speed indicator receiving unit having an improved wide range "creeping" compensation and which is provided by means producing excess compensation in one portion of the range, and under compensation in another portion of the range.

Another object of the present invention is to provide a combined electric speed indicator receiving unit and odometer wherein compensation is provided for heating resulting from operation of the odometer, which is mounted near the receiving unit.

Figure 2:
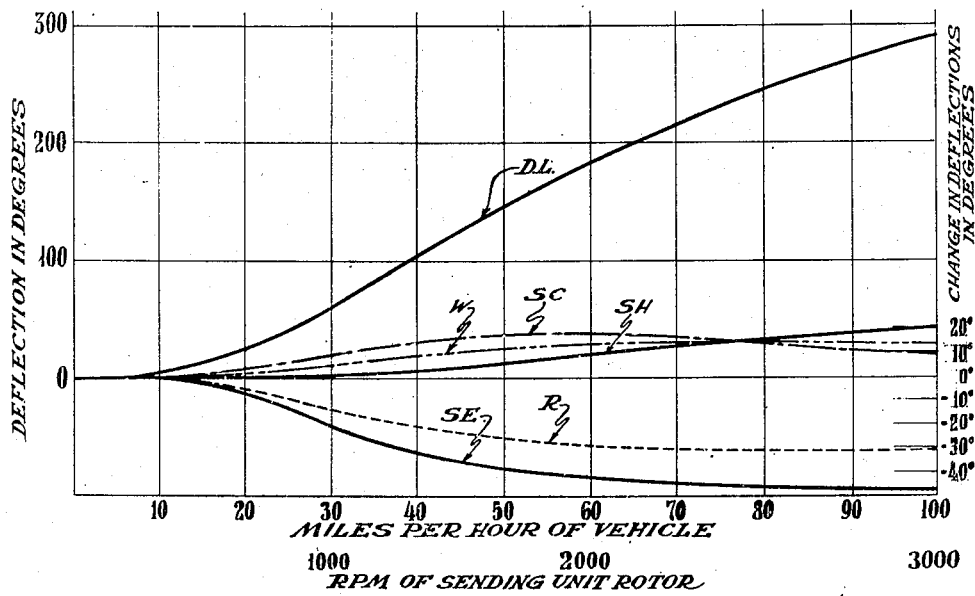

Other objects and advantages of the present invention will become apparent from the ensuing description, in the course of which reference is had to the accompanying drawing, in which:

Fig. 1 is a diagrammatic representation of one embodiment of the present invention. This embodiment includes a sending unit, a receiving unit, and an odometer. Rotors associated with the sending and receiving units have been omitted for the purpose of simplicity, but they may take various forms such, for instance, as those disclosed in my Patent No. 2,339,743 referred to above;

Fig. 2 is a graph comprising a series of curves which will be referred to for a better understanding of the principles of the present invention.

Referring now to the drawing, and particularly to Fig. 1, it may be noted that the speed indicator of the present invention includes a sending unit 10 and a receiving unit 12. These units are connected to each other by three inter-unit conductors 14, 16 and 18 of a length dependent upon the relative locations of the units. Generally speaking, the sending unit is located in proximity of the device whose speed is to be indicated, and the receiving unit near the position occupied by the operator of the device. Ordinarily, the receiving unit would be in the operator's station or driver's or pilot's compartment, and the sending unit near the engine of the vehicle.

The sending unit includes a polyphase, preferably a three-phase, alternating current generator comprising the star-connected fixed armature windings 20, 22 and 24. These windings have associated therewith a multi-pole permanent magnet rotor (not shown) rotated by a suitable means at a speed bearing a constant relationship with the speed of the device whose speed is to be indicated. Rotation of the rotor induces a three-phase alternating current in the armature windings which is supplied to the receiving unit through the conductors 14, 16 and 18.

The receiving unit also consists of three star-connected fixed armature windings 30, 32 and 34 which, when supplied with alternating current, produce a revolving magnetic field in a manner well known to those skilled in the art. The revolving magnetic field is preferably utilized to effect rotation of an induction type aluminum (preferably) rotor, the rotation of which is restrained by resilient means such as a spiral spring. The torque exerted upon the speed cup is dependent upon the magnitude and frequency of the alternating currents generated by the sending unit, and since both of these characteristics are dependent upon the speed of rotation of the permanent magnet rotor, it will be seen that the speed cup assumes a position dependent upon the speed of the vehicle. The details of the physical construction of the sending and receiving units have not been shown, but as already indicated, they may be of the type disclosed in my previously referred to patent.

The odometer is of the electrically actuated type, including an electromagnet or coil 40 supplied with power from a suitable source of direct current, such as the battery 42. The coil is intermittently energized by current from the battery under the control of a switch 44 closed periodically by a cam 46. The cam is so constructed and arranged that the switch 44 is closed whenever a vehicle upon which the apparatus is mounted has traveled a predetermined distance. When the switch is closed the coil is energized from the battery through a circuit including conductor 48, the coil 40, a resistance type heater 50 (the purpose of which will be described in greater detail hereinafter), inter-unit conductor 14, conductor 52, the switch 44, and ground.

Temperature compensation is provided by means including the negative temperature coefficient resistors 54, 56 and 58, each in circuit with one-phase connection. Resistor 54 is located at the receiving unit, and resistors 56 and 58 are located at the sending unit and are of smaller physical size than resistor 54. The temperature compensating means includes also a fourth negative temperature coefficient resistor 60, having a relatively high electrical resistance, located at the receiving unit and connected across windings 30 and 34. It is shunted by a zero temperature coefficient variable resistor 62. The series resistor 54 is shunted by a zero temperature coefficient resistor 64, and the resistor 54 is also surrounded by, or otherwise located so as to be in heat transfer relation with the resistance type heater 50 included in the odometer actuating circuit. A zero temperature coefficient variable resistor 66 is connected in series with the winding 30 at the receiving unit.

The described arrangement represents an improvement over the arrangement disclosed and claimed in my previously referred to patent. In that disclosure three negative temperature coefficient resistors were utilized. These included the resistors 56 and 58, and a similar resistor corresponding to resistor 54. The arrangement included also a positive temperature coefficient resistor connected across windings 30 and 34, and a resistor corresponding to resistor 66.

Accordingly, the present arrangement differs from the previous one by the use of a physically (not electrically) larger resistor 54 and the addition of a shunt resistor around it, and in the use of a fourth negative temperature coefficient resistor 60 and its associated shunt resistor. Furthermore, the present arrangement compensates for heating due to the periodic energization of the odometer actuating electromagnet 40.

In the succeeding description of the principles of the present invention reference will be had to Fig. 2, wherein the abscissae represent the speed of rotation of the sending unit rotor or the speed of translation of a vehicle (or the speed to be indicated, which may be the speed of rotation of an engine), and the ordinates represent deflection of the receiving unit indicator or pointer. The ordinate scale at the left, which is utilized only with the uppermost curve DL, represents the angular deflection of the receiving unit indicating pointer in degrees, and the ordinate scale at the right represents the change in angular deflection in degrees, and it is used in connection with curves other than curve DL. The ranges and values are illustrative of but one embodiment of the invention and for one temperature change, as described hereinafter.

The curve DL is representative of the dial layout, i. e., the needle deflection for various sending unit speeds. It may be chosen more or less arbitrarily and is so chosen that the apparatus may be calibrated to read properly by adjustment of the zero temperature coefficient series and shunt resistors 66 and 62, which may be termed calibrating resistors. It may be well to note at this point that the calibrating resistor 62 might be placed in series with the negative temperature coefficient resistor 60 if desired. In so far as calibration is concerned, a variation in the series resistor has the effect of changing the deflection of the needle at lower speeds, and variation of the shunt calibrating resistor 62 has the effect of varying mainly the deflection at higher speeds. In another aspect, the change of the shunt resistor is, in effect, a change in resistance and effective reactance while a change in the series resistor is a change in resistance. The dial layout is so chosen that the shunt and series resistors can be adjusted to effect calibration at two different points, i. e., the dial layout curve can be intersected by actual readings at two widely separated points, thereby to achieve greater accuracy in calibration of the instrument. When the series resistance is increased the needle deflection at lower speeds is decreased, and when the shunt resistance is increased, the needle deflections are increased at higher speeds.

The remaining curves are illustrative of various effects of parts of the receiving unit when its temperature drops from, say about 80° F. to 10° F. below zero, while the temperature of the sending unit remains unchanged.

The curve labeled SC represents the effect of this temperature change upon the needle deflection due to the speed cup. When the temperature drops, the resistance of the speed cup decreases, with the result that the deflection of the needle increases. The increase in deflection, however, is not uniform for all speeds, as may be noted from the curve.

The curve labeled W represents the increase in deflection of the needle due to the decrease in ambient temperature and consequent decrease in resistance of the windings 30, 32 and 34. When the ambient temperature decreases, the resistance of the windings decreases, with the result that the deflection increases.

Curve SH represents the increase in deflection of the needle due to a decrease in temperature and the resulting increase in resistance of the shunt negative temperature coefficient resistor 60. While the decrease in temperature results in an increase in the resistance of resistor 60, the resultant effect is an increase in current flow through the windings because the resistor 60 is connected in shunt to the windings.

The curve SE represents a decrease in deflection resulting from the decrease in ambient temperature and the resulting increase in the resistance of the series negative temperature coefficient resistor 54.

The curve R represents the resultant of the changes due to the series negative temperature coefficient resistor and the winding, i. e., it is the resultant of curves SE and W.

The series resistor 54 compensates for the change in deflection caused by a change in temperature of the windings 30, 32 and 34. Not only does the series resistor compensate for the effect of the ambient temperature change upon the windings, but it provides excess compensation which, when combined with the compensation provided by the shunt negative temperature coefficient resistor, offsets the effect of the temperature change on the speed cup. In other words, the combined effect of the series and shunt negative temperature coefficient resistors offsets the change in deflection due to ambient temperature changes upon the speed cup and winding. Looking at the matter in another aspect, the algebraic sum of the curves SC, SH and R is equal to zero.

Since the odometer and the electromagnet 40 are in close proximity to the indicator unit the heat resulting from operation of the odometer heats the indicator unit. However, the resistance type heater 50 offsets the heating effect of the odometer due to the fact that it is energized when the odometer operates, and being in heat transfer relation with the negative temperature coefficient resistor 54, heats the latter, thus decreasing its resistance. As a result, any increase in resistance in the indicator unit due to heating by the odometer is offset by decreases in resistance in the negative temperature coefficient resistor 54. Thus compensation is effected for any variations in the deflection of the needle of the indicator which would otherwise occur.

While Fig. 2 shows the conditions obtained for one change in temperature, i. e., a drop of say about 90° F., the curves for other temperature drops would be similar. The curves would indicate greater magnitudes for higher temperatures, and lesser magnitudes for lower temperatures.

It may be observed that if the effect of the speed cup was different, because of different structural arrangements as in another instrument having different physical characteristics, etc., then, ambient temperature compensation could still be obtained by utilizing different values of the series and shunt negative temperature coefficient resistors, i. e., using resistors having different overall resistance values so that the same temperature change would give different ohmic resistance changes. Or, different materials having different temperature coefficients of resistance could be used; or, different combinations of materials and resistances could be used.

The dial layout actually does not affect the compensation, as the correspondence of the actual deflection to the dial layout is a matter of initial calibration by adjustment of the series and shunt variable resistors 66 and 62. In other words, the temperature compensation is independent of the shape of the dial layout.

In addition to compensation for variations in ambient temperature, the present invention provides compensation as a result of heating due to losses, i. e., heating due to the $I^2R$ losses. As the windings heat, as upon the apparatus being placed into operation, due to current flow through them, their resistance increases. As the temperatures of the negative temperature coefficient resistors increase because of the current flow through them, their resistance decreases. Thus, the series resistor 54 tends to offset the changes in the winding and in the shunt resistor.

The losses cause heating of the various current carrying parts and their temperatures rise, as does that of the speed cup. The resistances of the windings and speed cup increase while the resistances of resistors 54 and 60 decrease. The change in resistor 54 tends to increase the deflection of the pointer while the changes in the others tend to decrease the deflection.

In accordance with one feature of the present invention, the resistors 54 and 60 are chosen as to their characteristics that at some intermediate temperature range, say of about 30° to 40° F., there is substantially no change in deflection with time as the current heats the parts and at temperatures above and below this range there are slight drifts downward (decrease in deflection) and upward (increase in deflection) with time. This is accomplished by proper selection of dimensions of resistors 54 and 60 and more specifically by making resistor 54 large as compared to resistor 60.

At the intermediate range the heat losses heat the various parts and the dissipation of heat from them is such that a balance exists, i. e., the increase in deflection due to heating of resistor 54 balances the decrease in deflection due to heating of the other parts. In general, this requires resistor 54 to be larger than resistor 60 and resistors 56 and 58. In the lower temperature range the series resistor 54 is more effective than the others. This is because its resistance is then higher so the $I^2R$ loss is greater and its characteristics are such that there is then more change in resistance per degree temperature change. In the higher temperature range the parts other than the series resistor are more effective than the latter so that there results a decrease in deflection with time.

With the foregoing construction there is obtained a good overall operation, i. e., the "creeping" is relatively small even at the ends of the range of temperature variation, which may be from about 120° F. to about 20° F. below zero.

It is difficult to obtain negative temperature coefficient resistors having characteristics such as would provide the desired temperature compensation. For one thing, the resistors do not have a sufficiently straight line temperature-resistance characteristic. Therefore, in accordance with another feature of the present invention, this characteristic is straightened by placing a shunt resistor around the resistor. Thus, the resistor 54 is shunted by resistor 64, and the resistor 60 is shunted by resistor 62. If desirable, the resistors 56 and 58 at the sending unit could be similarly shunted.

The shunt resistor 64 around resistor 54 has another advantage. The resistor should be relatively large in order to prevent undue temperature rise in it because of heat losses, but by using the shunt resistor 64 its size can be reduced. Less current flows in it and there is less temperature rise. In other words, assuming that a large series resistor is the required or desired resistor, then, the same effect can be obtained by using a smaller resistor and reducing the current flow through it. The use of a smaller resistor reduces the cost, and also the weight not only of the resistor, but of the receiving unit. As a result the unit can be made smaller.

The shunt resistor 62 around the shunt negative temperature coefficient resistor 60 also straightens out its characteristic, as already indicated. Furthermore, it is made variable so that the effective resistance of the shunt circuit may be varied for calibration purposes.

In accordance with another of the features of the present invention, the receiving unit may be constructed so that there is no "creeping" when it is located in a region where the ambient temperature is that normally found in a room, say about 70 degrees F. This is accomplished by shunting some of the current around the series resistor 54, something that can be done easily by lowering the resistance of resistor 64, and eliminating resistor 60. These changes have the effect of shifting the range of balance, as far as "creeping" is concerned, to a higher temperature range. The series resistor 54 becomes less effective, especially at lower temperature, because of the shunting of current therefrom, but at the same time the shunt resistor 60, which opposes resistor 54, is eliminated, so that balancing occurs at a higher temperature.

The arrangement in which the shunt negative temperature coefficient resistor is eliminated does not provide as good ambient temperature compensation as the other but it is still good. The reason why as good ambient temperature compensation is not possible is because of the nature of the curve SC which, it may be remembered, drops off at higher speeds. It cannot be compensated for by the use of the series resistor alone, the effect of which is illustrated by a curve SE which does not have the drooping characteristic necessary for compensation at higher speeds.

The resistance of the resistors and their physical characteristics will depend upon the particular constructions of the receiving units with which they are to be used. If the sending and receiving units are constructed as disclosed in my previously referred to Patent No. 2,339,743, the resistors may have the following values (approximately):

Resistor 54:
    13 ohms at minus 20° F.
    10.3 ohms at 0° F.
    8 ohms at 20° F.
    4.2 ohms at 80° F.
    3.6 ohms at 100° F.

Resistor 60:
    423 ohms at minus 20° F.
    341 ohms at minus 4° F.
    220 ohms at 32° F.
    150 ohms at 68° F.
    107 ohms at 100° F.

Resistor 62:
    A total resistance of about 60 ohms, of which about 40 ohms is usually effective.

Resistor 64:
    About 19 ohms.

Resistor 66:
    A total resistance of about 5.6 ohms, of which about 3 ohms is ordinarily effective.

The foregoing values, it should be understood, are given for the purpose of illustration and not limitation of the principles of the invention and, as heretofore indicated, different values will ordinarily be necessary for different structures.

While the invention has been described in detail in connection with certain embodiments thereof, the details should not be construed as being limitative of the invention except insofar as set forth in the accompanying claims.

What I claim as new and desire to secure by United States Letters Patent is:

1. In a receiving unit of an electric indicator of the type comprising a three-phase armature winding, the combination including, a negative temperature coefficient resistor in series with one phase, and a negative temperature coefficient resistor in shunt across two phases.

2. In a receiving unit of an electric indicator of the type comprising a three-phase armature winding, the combination including, a negative temperature coefficient resistor in series with a first phase, and a negative temperature coefficient resistor in shunt across the remaining two phases.

3. In a receiving unit of an electric indicator of the type comprising a three-phase armature winding, the combination including, a negative temperature coefficient resistor in series with one phase, a negative temperature coefficient resistor in shunt across two phases, and zero temperature coefficient resistors shunting each of said negative temperature coefficient resistors.

4. In a receiving unit of an electric indicator of the type comprising a three-phase armature winding, the combination including, a negative temperature coefficient resistor in series with one phase and a negative temperature coefficient resistor in shunt across two phases, said series resistor being the larger in size of the two.

5. In a receiving unit of an electric indicator of the type comprising a three-phase armature winding, the combination including, a variable resistor having a zero coefficient of resistance in series with one phase winding, a negative temperature coefficient resistor in series with one phase winding, a second variable resistor having a zero temperature coefficient of resistance connected in shunt with a pair of phase windings, and a negative temperature coefficient resistor connected in shunt across the last said pair of phase windings.

6. In a receiving unit of a combined electric speedometer and odometer of the type comprising a three-phase armature winding for actuating the speedometer and an electromagnet in proximity thereto for actuating said odometer, the combination including, a negative temperature coefficient resistor in series with a phase winding, and means for energizing said electromagnet including a resistor in the circuit of said electromagnet and in heat transfer relation to said first mentioned resistor.

7. In a receiving unit of a combined electric speedometer and odometer of the type comprising a three-phase armature winding for actuating the speedometer and an electromagnet in proximity thereto for actuating said odometer, the combination including, a negative temperature coefficient resistor in series with a phase winding, and means for heating said resistor proportionately to the heating effect of said electromagnet upon said speedometer.

HORACE M. NORMAN.

REFERENCES CITED

The following references are of record in the file of this patent:

UNITED STATES PATENTS

| Number | Name | Date |
| --- | --- | --- |
| 870,253 | Schweitzer | Nov. 5, 1907 |
| 2,339,743 | Norman | Jan. 18, 1944 |